(No Model.)
C. R. FOSTER.
ROTARY PLOW.
No. 360,090. Patented Mar. 29, 1887.
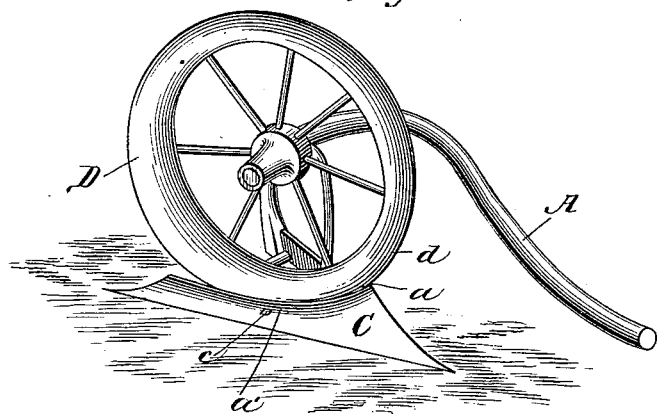
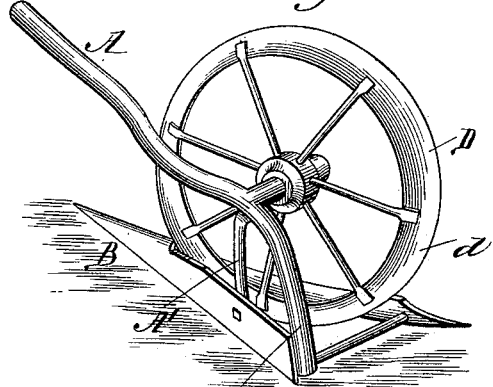
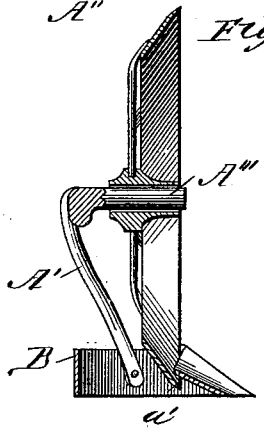
Witnesses.
V. Rossiter
Jno. H. Whipple
Inventor,
Charles R. Foster
By, Merriam & Whipple
Attys.

UNITED STATES PATENT OFFICE.

CHARLES R. FOSTER, OF CHICAGO, ILLINOIS.

ROTARY PLOW.

SPECIFICATION forming part of Letters Patent No. 360,090, dated March 29, 1887.

Application filed September 18, 1883. Renewed December 23, 1886. Serial No. 222,380. (No model.)

*To all whom it may concern:*

Be it known that I, CHARLES R. FOSTER, of Chicago, Illinois, have invented certain new and useful Improvements in Rotary Plows, of which the following is a specification.

The invention consists in the combination and arrangement, in a plow, of a concave rotary disk having a cutting-edge with a share and landside in such manner that the disk shall operate as a colter and mold-board and the share shall cut the bottom of the furrow and with the landside act as a guide to the disk in plowing, as hereinafter shown and described.

The accompanying drawings illustrate the invention.

Figure 1 is a front perspective view. Fig. 2 is a reverse or landside perspective; and Fig. 3 is a cross-vertical section taken through the center of the disk.

A is a plow-beam, which is provided with standards A' A" and a spindle, A'''. The landside B is secured to the standards A' A", and the share C is secured to the landside by being made integral therewith, or by a bolt, as c, securing it to an arm of the landside when made separate. The disk D rotates freely upon the spindle. It is about three feet in diameter, and the flange has a continuous cutting-edge, d, and is about six inches wide, or a little wider. The disk stands about forty degrees diagonal to the line of draft or landside, and sufficiently forward to bring the forward edge above the landside at the point a into the position of the colter of a plow, the elevation being such that the lowest point of the disk, as at a', shall be slightly above the bottom of the furrow as cut by the share.

The share may be of the usual construction, but is preferably made so that its upper edge will be substantially in line with the circular edge of the disk from a to a', and slightly in advance of it. By this arrangement of the parts the disk performs the work of the colter and mold-board of a plow, or does substantially all the work of plowing, the share and landside operating chiefly as a guide to the disk.

I am aware that a revolving concave disk is shown in the patent of George Page, of August 7, 1847, in place of the mold-board for turning the furrow, the other parts of the plow—the share, landside, and cutter—being adapted thereto. The cutter is thickened at its back edge, and there has a recess curved so as to fit the periphery of the disk. It thus serves the purpose of cutting the side of the furrow at the front edge, while the thickened portion at the back carries the same out to meet the periphery of the disk. My invention does not include such or any stationary cutter, nor the arrangement of disk on the plow shown by Page; but such cutter or colter is omitted, and the disk is provided with a cutting-edge and brought farther forward, so that the front edge cuts the side of the furrow. Instead of having the edge of the disk fitted to the share, it stands behind the share. The disk by this arrangement is made to do the work of both colter and mold-board, or, in other words, it both cuts the furrow at the side and turns it, leaving the share as a mere guide to the depth, and the landside as a guide to the width of the plowing.

What is claimed is—

In a plow, the combination of the disk D with the landside B and share C, the disk being arranged so that its front edge shall be in line with and above the front part of the landside in the place of the colter, and so that its lower edge shall be below and slightly back of the rear edge of the share, substantially as and for the purpose specified.

CHAS. R. FOSTER.

Witnesses:
JOHN H. WHIPPLE,
JOSEPH W. MERRIAM.